(No Model.)
D. BROOKS, Jr.
METHOD OF INTRODUCING COMPOSITIONS INTO ELECTRIC CONDUCTORS.
No. 427,039. Patented May 6, 1890.
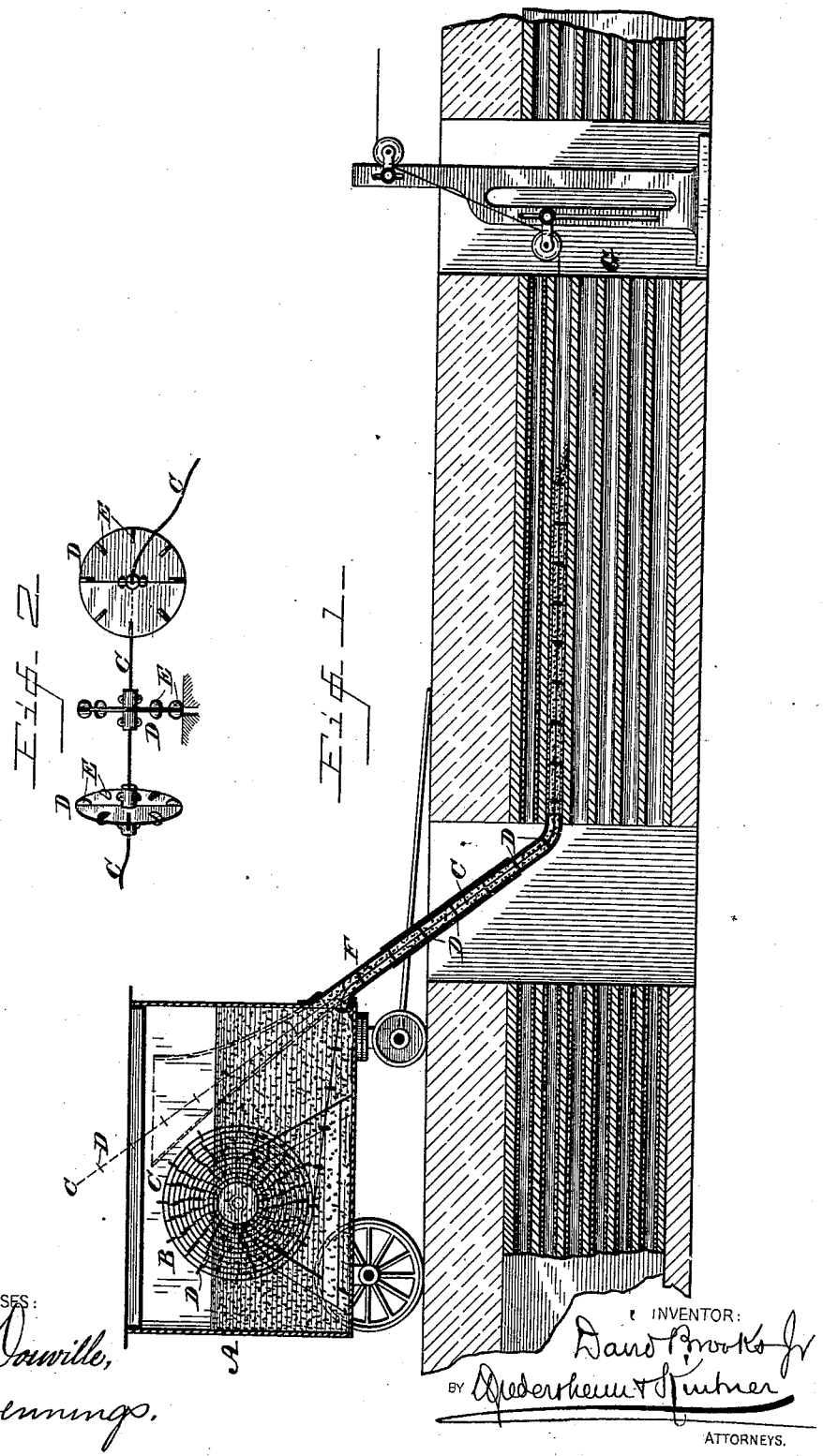

United States Patent Office.

DAVID BROOKS, JR., OF PHILADELPHIA, PENNSYLVANIA.

METHOD OF INTRODUCING COMPOSITIONS INTO ELECTRIC CONDUCTORS.

SPECIFICATION forming part of Letters Patent No. 427,039, dated May 6, 1890.

Application filed March 1, 1889. Serial No. 301,664. (No model.)

*To all whom it may concern:*

Be it known that I, DAVID BROOKS, Jr., a citizen of the United States, residing in the city and county of Philadelphia, State of Pennsylvania, have invented a new and useful Improvement in Introducing Protecting Materials or Compositions into Electric Conductors, which improvement is fully set forth in the following specification and accompanying drawings.

My invention consists of a novel manner of introducing a lining of protecting material or composition into a conduit for electric conductors, as will be hereinafter set forth.

Figure 1 represents an apparatus employed in carrying my invention into effect. Fig. 2 represents a perspective view of a portion of the same.

Similar letters of reference indicate corresponding parts in the several figures.

In carrying out my invention I prepare a conduit or duct for electric conductors to receive protecting materials and cables of electric wires, as follows: Dry swabs of cotton or cotton waste are run through the conduit, so as to dry the same or absorb the moisture that it may contain. If desired, this may be accelerated by the use of a hot-air blast. I then introduce into the conduit a composition of non-fusible powder or oil or any semifluid material, such as powdered soapstone or soapstone and rosin-oil, either of these being preferred, since either or both prevent water or moisture from passing through a good layer or coating. It may be convenient to introduce the protecting material into each section of the conduit as it is laid, care being taken to leave sufficient space for the cable to enter subsequently. The material may also be introduced into the splice-boxes, &c.

The material has for its object the filling of the space left between the cable and sides of the conduit to prevent the circulation of air and gases, and also prevent the introduction of water or moisture and foreign matter into the conduit, the material owing to its semifluid or movable nature also allowing the cable to be drawn out and replaced as desired.

The cable may be of dried fibrous, tissue-covered, rubber insulation, or other suitable kind.

I now employ a movable tank A, containing a reel B, on which is wound a wire or other rope C, said tank being supplied with the protecting material. Secured to the rope at intervals are buckets or carriers D, to whose peripheries are attached lugs E, whereby said buckets are prevented from dropping into crevices or separated joints in the length of the conduit. The rope is drawn from the reel in the tank through the discharge-pipe F, which is in communication with said tank and the conduit, and likewise drawn into and through the conduit, whereby the material is conveyed into the latter.

The rope should be pulled through the conduit for some time after the material appears at the end G of the conduit, as some of said material will return over the buckets, the latter being of such diameters that when the cable is subsequently introduced into the conduit sufficient space will be left for the cable to enter the same from one end to the other.

The rope, with the buckets thereon, is drawn through the conduit, and as the said buckets are of less diameter than the condut, while the greater portion of the composition is drawn out with the buckets, the walls of the conduit are effectively lined or coated with the composition. The cable is then drawn through the conduit and occupies the central opening or space through which the buckets were passed.

I am aware that it is not new to employ as insulating material soapstone with either paraffine or crude petroleum; but as both these oils are lighter than water they would not serve the purpose intended by my invention, wherein the mixture placed in the conduit in the manner described serves not as an insulator, but as a protector to prevent moisture or decay.

Having thus described my invention, what I claim as new, and desire to secure by Letters Patent, is—

The herein-described method of preparing a conduit for electric wires, consisting, first, in thoroughly drying the interior of said tube by passing through the same dry waste and hot air, then drawing into the conduit and along the interior of the same a sufficient quantity of soapstone and rosin-oil or their equivalents by means of a rope with carriers to fill said conduit, and, lastly, withdrawing said rope and carriers, substantially as described.

DAVID BROOKS, JR.

Witnesses:
 JOHN A. WIEDERSHEIM,
 A. P. JENNINGS.